(12) United States Patent
Camiolo et al.

(10) Patent No.: US 10,222,855 B2
(45) Date of Patent: Mar. 5, 2019

(54) METHOD AND SYSTEM FOR MANAGING THE POWER SUPPLY VOLTAGE OF A USB TYPE-C SOURCE DEVICE

(71) Applicant: STMicroelectronics (Grenoble 2) SAS, Grenoble (FR)

(72) Inventors: Jean Camiolo, St. Egrêve (FR); Christophe Lorin, Montbonnot (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 15/444,724

(22) Filed: Feb. 28, 2017

(65) Prior Publication Data

US 2018/0074574 A1 Mar. 15, 2018

(30) Foreign Application Priority Data

Sep. 14, 2016 (FR) ..................................... 16 58582

(51) Int. Cl.
| | |
|---|---|
| G06F 1/32 | (2006.01) |
| G06F 13/38 | (2006.01) |
| G06F 13/42 | (2006.01) |
| G06F 13/24 | (2006.01) |
| G06F 1/16 | (2006.01) |
| G06F 1/3296 | (2019.01) |
| G05F 1/00 | (2006.01) |
| G06F 1/26 | (2006.01) |
| G06F 1/3287 | (2019.01) |
| H01R 24/28 | (2011.01) |
| H01R 24/60 | (2011.01) |
| H01R 107/00 | (2006.01) |

(52) U.S. Cl.
CPC .............. *G06F 1/3296* (2013.01); *G05F 1/00* (2013.01); *G06F 1/26* (2013.01); *G06F 1/3287* (2013.01); *G06F 13/24* (2013.01); *G06F 13/385* (2013.01); *G06F 13/4282* (2013.01); *H01R 24/28* (2013.01); *H01R 24/60* (2013.01); *H01R 2107/00* (2013.01)

(58) Field of Classification Search
CPC ........ G06F 1/266; G06F 13/4027; H02H 9/02
USPC ........................................................ 710/313
See application file for complete search history.

(56) References Cited

U.S. PATENT DOCUMENTS

| | | | |
|---|---|---|---|
| 2009/0327789 A1* | 12/2009 | Zerbe ........................ G06F 1/10 |
| | | | 713/400 |
| 2010/0181840 A1 | 7/2010 | Coulson et al. | |
| 2013/0099745 A1 | 4/2013 | Johnson | |

(Continued)

FOREIGN PATENT DOCUMENTS

EP 2940592 A1 3/2015

*Primary Examiner* — Farley Abad
*Assistant Examiner* — Getente A Yimer
(74) *Attorney, Agent, or Firm* — Slater Matsil, LLP

(57) ABSTRACT

A method can be used for managing a power supply voltage on an output power supply pin of a USB Type-C source device coupled to a USB Type-C receiver device via a USB Type-C cable. A first measurement of a first voltage on a channel configuration pin of the cable is performed when the receiver device is not powered and a second measurement of a second voltage on the channel configuration pin is performed when the receiver device is powered. A difference between the first and second voltages is calculated and the power supply voltage is modified as a function of a value of the difference.

22 Claims, 4 Drawing Sheets

(56) References Cited

U.S. PATENT DOCUMENTS

| | | | |
|---|---|---|---|
| 2013/0279055 A1* | 10/2013 | Mullins | G06F 21/44 361/86 |
| 2013/0288610 A1* | 10/2013 | Toh | H03G 3/3042 455/67.14 |
| 2014/0159678 A1 | 6/2014 | Park et al. | |
| 2014/0162568 A1* | 6/2014 | Laskar | H01L 28/75 455/67.14 |
| 2016/0062935 A1* | 3/2016 | Talmola | G06F 1/266 710/306 |
| 2016/0118880 A1 | 4/2016 | Motoki | |

* cited by examiner

METHOD AND SYSTEM FOR MANAGING THE POWER SUPPLY VOLTAGE OF A USB TYPE-C SOURCE DEVICE

CROSS-REFERENCE TO RELATED APPLICATIONS

This application claims priority to French Patent Application No. 1658582, filed on Sep. 14, 2016, which application is hereby incorporated herein by reference.

TECHNICAL FIELD

Embodiments of the invention and their implementation relate to a method and system for managing the power supply voltage of a USB Type-C source device.

BACKGROUND

Theoretically, the USB 3.1 Type-C devices supporting the USB power delivery mode allow data rates up to 10 GB/s and up to 100 W of power to be delivered with a maximum voltage of 20 V and a maximum current of 5 A. The power to be delivered between two USB 3.1 devices Type-C is negotiable via specific controllers and the electrical power supply may advantageously be bidirectional between various USB 3.1 Type-C devices.

Generally speaking, a USB Type-C cable is designed so as to be coupled and to establish a power supply and communications line between a USB Type-C device referred to as "source" and a USB Type-C device referred to as "receiver."

The connectors of the USB 3.1 Type-C source or receiver devices each comprise two symmetrically-disposed channel configuration pins in such a manner as to render the connectors reversible. The two channel configuration pins of the source device are connected to 'pull-up' resistors or to current sources, whereas the two channel configuration pins of the receiver device are connected to 'pull-down' resistors.

In general, the high electrical current of 5 A present in the USB Type-C cables introduces large voltage drops and it is indispensable to avoid total voltage drops greater than 750 mV when the power supply voltage of the USB Type-C cables is, for example, 5 V since, in that case, a USB Type-C source device risks not being recognized by a connected USB Type-C receiver device.

By way of example, a source device cannot be recognized as a "source" by a receiver device when the power supply voltage output from the source device is too low because of the large voltage drop in a USB Type-C cable coupled between the source device and the receiver device.

Furthermore, the poor qualities and/or the non-conformities of the USB 3.1 Type-C cables may also increase the voltage drops within the cables.

SUMMARY

Embodiments of the invention and their implementation relate to universal serial bus (or USB) devices, notably the universal serial bus devices compatible with the USB 3.1 standard and comprising reversible connectors which do not impose any connection orientation, commonly known by those skilled in the art under the name of C type, more particularly the detection of voltage drops over USB cables linking two USB devices According to one embodiment and its implementation, a low cost and low complexity technical solution is offered for monitoring a voltage drop over a USB Type-C cable connected between a USB Type-C source device and a USB Type-C receiver device, in order to compensate for the voltage drop, and to detect overload or poor quality conditions of the USB Type-C cable.

According to one aspect, a method is provided for managing the power supply voltage on a power supply output pin of a USB Type-C source device coupled to a USB Type-C receiver device via a USB Type-C cable. A first measurement of a first voltage on a channel configuration pin of the cable is made when the receiver device is not powered. A second measurement of a second voltage on the channel configuration pin is made when the receiver device is powered. A difference between the first and second voltages is calculated and the power supply voltage is modified as a function of the difference.

Such a method does not require any parallel (or 'shunt') resistor for measuring the current flowing in the USB Type-C cable. Furthermore, the first voltage is advantageously auto-calibrated by the source device when a power switch is opened allowing the delivery or the interruption of the power supply voltage and is advantageously independent of the absolute value of a pull-down resistance of the receiver device or a current source of the source device.

Furthermore, such a method is virtually or totally insensitive to the variation in fabrication of pull-down resistors of the receiver device and of the current sources of the source device.

Advantageously, such a method allows a source device to deliver a voltage adapted to a receiver device connected via a cable in order to compensate for a voltage drop over the cable.

The modification of the power supply voltage may, for example, comprise an increase of the power supply voltage by a compensation value when the difference is less than or equal to a threshold.

By way of non-limiting example, the compensation value is in the range between one and three times the value of the difference.

The modification of the power supply voltage may also comprise an interruption of the power supply voltage, if the difference exceeds the threshold.

Advantageously, the first measurement of the first voltage is carried out over a period during which the receiver device is not powered, and the second measurement of the second voltage is carried out at the end of the period.

The method may, for example, comprise, during the period, a first delivery of a first current on the channel configuration pin and a first initial measurement of a first initial voltage on the channel configuration pin, and a second delivery of a second current, greater than and proportional to the first current, on the channel configuration pin, together with a second initial measurement of a second initial voltage on the channel configuration pin.

According to one embodiment, if the first and second initial voltages are proportional, the first measurement of the first voltage is the first initial measurement of the first initial voltage.

According to another embodiment, the method furthermore comprises, if the first and second initial voltages are not proportional, a third delivery of a third current, lower than the first current, on the channel configuration pin and a third initial measurement of a third initial voltage on the channel configuration pin, and the first measurement of the first voltage is then the third initial measurement of the third initial voltage.

According to another aspect, a USB Type-C system is provided that is capable of managing the power supply voltage of an output power supply voltage pin of a source device itself coupled to a USB Type-C receiver device via a USB Type-C cable. The source device comprises a measurement circuit configured for performing a first measurement of a first voltage on a channel configuration pin of the cable when the receiver device is not powered and a second measurement of a second voltage on the channel configuration pin when the receiver device is powered. Computation circuitry is configured for performing a calculation of a difference between the first and second voltages. A controller is configured for carrying out a modification of the power supply voltage as a function of the difference.

The controller may furthermore be configured for increasing the power supply voltage by a compensation value when the difference is less than or equal to a threshold.

By way of example, the compensation value is in the range between one and three times the value of the difference.

The controller may advantageously be configured for interrupting the power supply voltage, if the difference exceeds the threshold.

Such an interruption of the power supply voltage advantageously allows the source device, and also the receiver device, to be protected.

The measurement circuit may, for example, be furthermore configured for performing the first measurement of the first voltage over a period during which the receiver device is not powered, and the second measurement of the second voltage at the end of the period.

The source device may furthermore comprise a processor configured for delivering, during the period, a first current on the channel configuration pin and a second current, higher than and proportional to the first current, on the channel configuration pin, the measurement circuit being furthermore configured for carrying out, in the presence of the first current, a first initial measurement of a first initial voltage on the channel configuration pin and a second initial measurement of a second initial voltage on the channel configuration pin in the presence of the second current.

According to one embodiment, if the first and second initial voltages are proportional, the controller is furthermore configured for selecting the first initial measurement of the first initial voltage as the first measurement of the first voltage.

According to another embodiment, if the first and second initial voltages are not proportional, the processor is furthermore configured for delivering a third current, lower than the first current, on the channel configuration pin, the measurement circuit is furthermore configured for carrying out a third initial measurement of a third initial voltage on the channel configuration pin in the presence of the third current, and the controller is furthermore configured for selecting the third initial measurement of the third initial voltage as the first measurement of the first voltage.

According to yet another aspect, a USB Type-C source device is provided that is designed to belong to a USB system such as defined hereinbefore.

According to yet another aspect, an electronic apparatus is provided, such as a cellular mobile telephone, a tablet, or a portable computer, comprising a USB Type-C source device such as defined hereinabove.

BRIEF DESCRIPTION OF THE DRAWINGS

Other advantages and features of the invention will become apparent upon examining the detailed description of non-limiting embodiments, and from the appended drawings in which.

DETAILED DESCRIPTION OF ILLUSTRATIVE EMBODIMENTS

Figure 1:
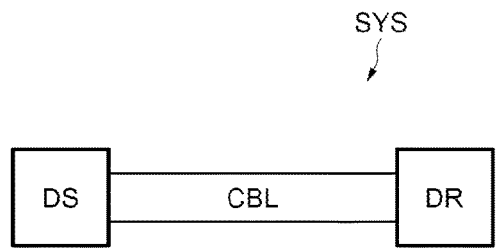
FIGS. 1 to 6 illustrate schematically embodiments of the invention and their implementation.

FIG. 1 illustrates schematically one example of a USB Type-C system SYS according to the invention.

The system SYS comprises a USB Type-C source device DS coupled to a USB Type-C receiver device DR via a USB Type-C cable CBL.

Figure 2:
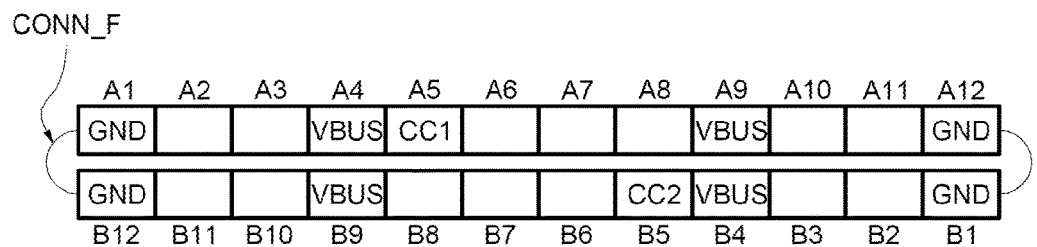

The source device DS and the receiver device DR each comprise a connector CONN_F of the female type, comprising two channel configuration pins CC1 and CC2, four pins for output power supply voltage VBUS and four ground pins GND, as illustrated in FIG. 2.

A voltage drop associated with the ground conductor of the cable CBL may be measured between a channel configuration pin CC1 or CC2 and a ground pin GND. A voltage drop associated with the positive potential conductor of the cable CBL may be measured between an output power supply voltage pin VBUS and a ground pin GND.

According to the USB 3.1 Type-C standard, all the pins of the same type described hereinabove are symmetrical with respect to the center of the connector CONN_F such that there is no connection orientation imposed on the connector CONN_F.

Figure 3:
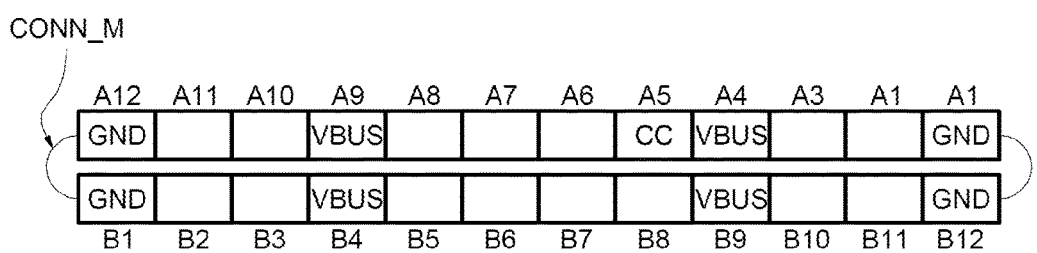

The USB Type-C cable CBL comprises two cable connectors CONN_M of the male type (FIG. 3) each containing a channel configuration pin CC of the cable designed so as to be coupled to one of the two channel configuration pins CC1 or CC2 of the source device DS or of the receiver device DR, four pins for the output power supply voltage VBUS and four ground pins GND. These pins for the output power supply voltage VBUS and ground GND are respectively connected to the corresponding pins in the source device DS and receiver device DR for a connection via the cable CBL.

Figure 4:
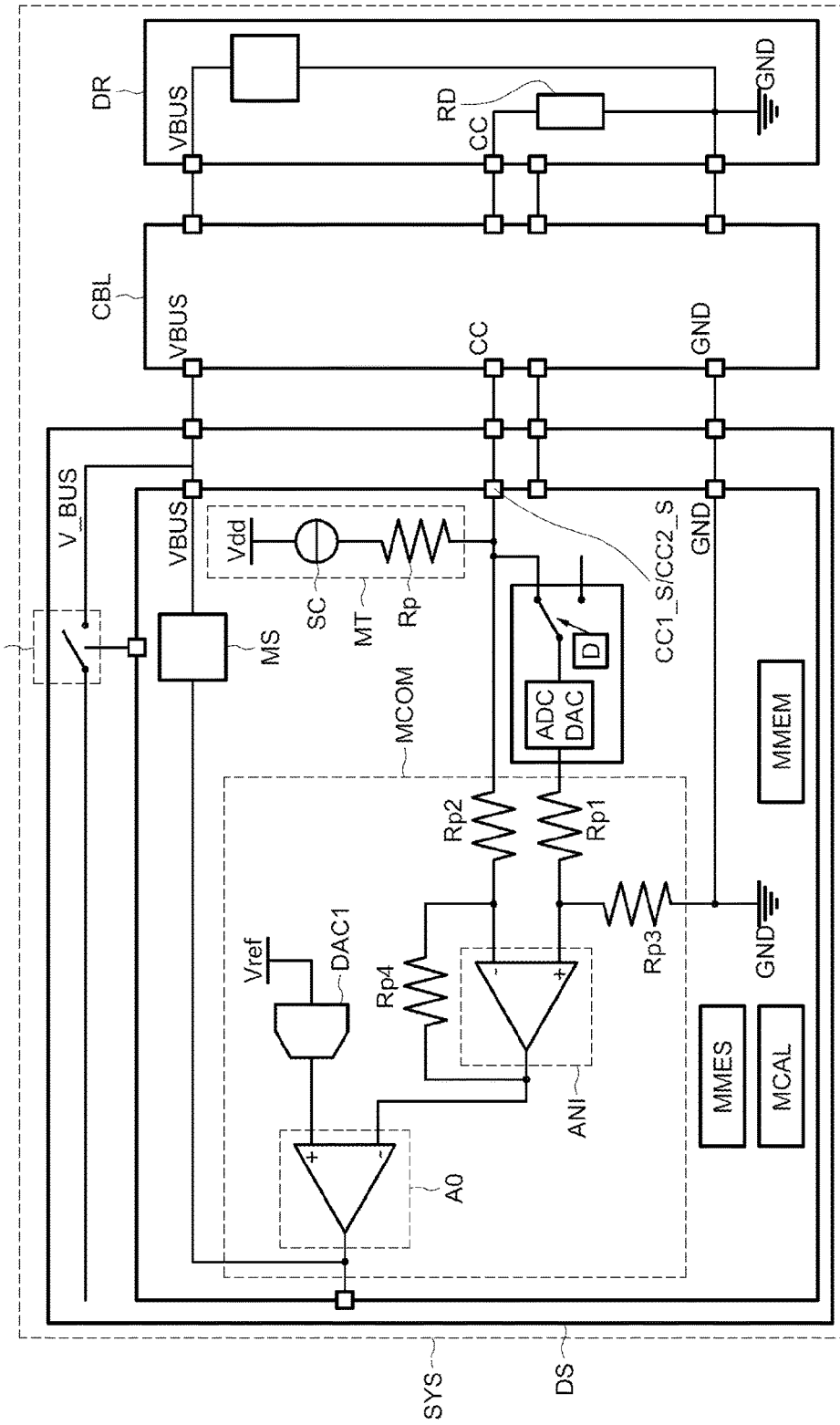

Reference is now made to FIG. 4 in order to illustrate one example of a source device DS according to the invention.

The source device DS comprises a power switch CP connected to an output power supply voltage pin VBUS and configured to allow delivery of an output power supply voltage V_BUS when it is in the closed state and interruption of the output power supply voltage V_BUS when it is in the open state. The output power supply voltage V_BUS is designed so as to be delivered to the receiver device DR via the cable CBL and to power the receiver device DR.

The source device DS furthermore comprises a processor MT configured for delivering to the receiver device DR, by means of a variable current source SC, a first, a second and potentially a third current having respectively a first value, a second value and a third value for a period D, here, for example, a channel configuration response time.

The source device DS also comprises a measurement circuit MMES configured for measuring a first voltage V1 and a second voltage V2 on the channel configuration pin CC of the cable CBL during and at the end of the period D.

The measurement circuit MMES is further configured for measuring a first, a second and potentially a third initial voltage on the channel configuration pin CC of the cable so as to determine an initial condition of the source device DS.

The source device DS also comprises a memory MMEM configured for storing the first voltage V1 in memory for the period D.

The source device DS also comprises computation circuitry MCAL configured for calculating a difference DIF in voltage between the first and second voltages V1 and V2.

The source device DS also comprises a controller MCOM configured for determining an initial condition DI of the source device DS and the quality of the cable CBL as a function of the first and second initial voltages VI1 and VI2, and modifying the output power supply voltage V_BUS of the source device DS as a function of the result of the calculation of the difference DIF in voltage.

The processor MT here comprise, for example, a current source of the 'pull-up' type connected to a channel configuration pin CC1_S/CC2_S of the source device DS.

By way of example, the memory MMEM here comprise an analog/digital converter ADC, a digital/analogue converter DAC and a switch controllable by the channel configuration response time (period D).

The controller MCOM here, for example, comprise a non-inverting amplifier ANI whose positive input is connected to the memory MMEM via a first pull-up resistor Rp1 and whose negative input is connected to the channel configuration pin connected CC via a second pull-up resistor Rp2. The positive input is furthermore connected to ground via a third pull-up resistor Rp3. A fourth pull-up resistor Rp4 is coupled between the negative input and the output of the non-inverting amplifier ANI.

The controller MCOM furthermore comprise an operational amplifier AO whose negative input is coupled to the output of the non-inverting amplifier ANI and whose positive input is coupled to a reference voltage Vref via a 10-bit digital/analogue converter DAC1, and a monitoring circuit MS coupled between the output of the operational amplifier AO and the output power supply voltage pin VBUS.

The monitoring circuit MS is advantageously configured for adjusting under-voltage lock-out (or UVLO) values and over-voltage lock-out (or OVLO) values. These lock-out values UVLO and OVLO may advantageously be auto-calibrated as a function of the first voltage V1 when the receiver device DS is not powered, in other words when the power switch CP is in its open state.

The measurement circuit MMES and computation circuitry MCAL are of conventional structure and known per se.

Figure 5:
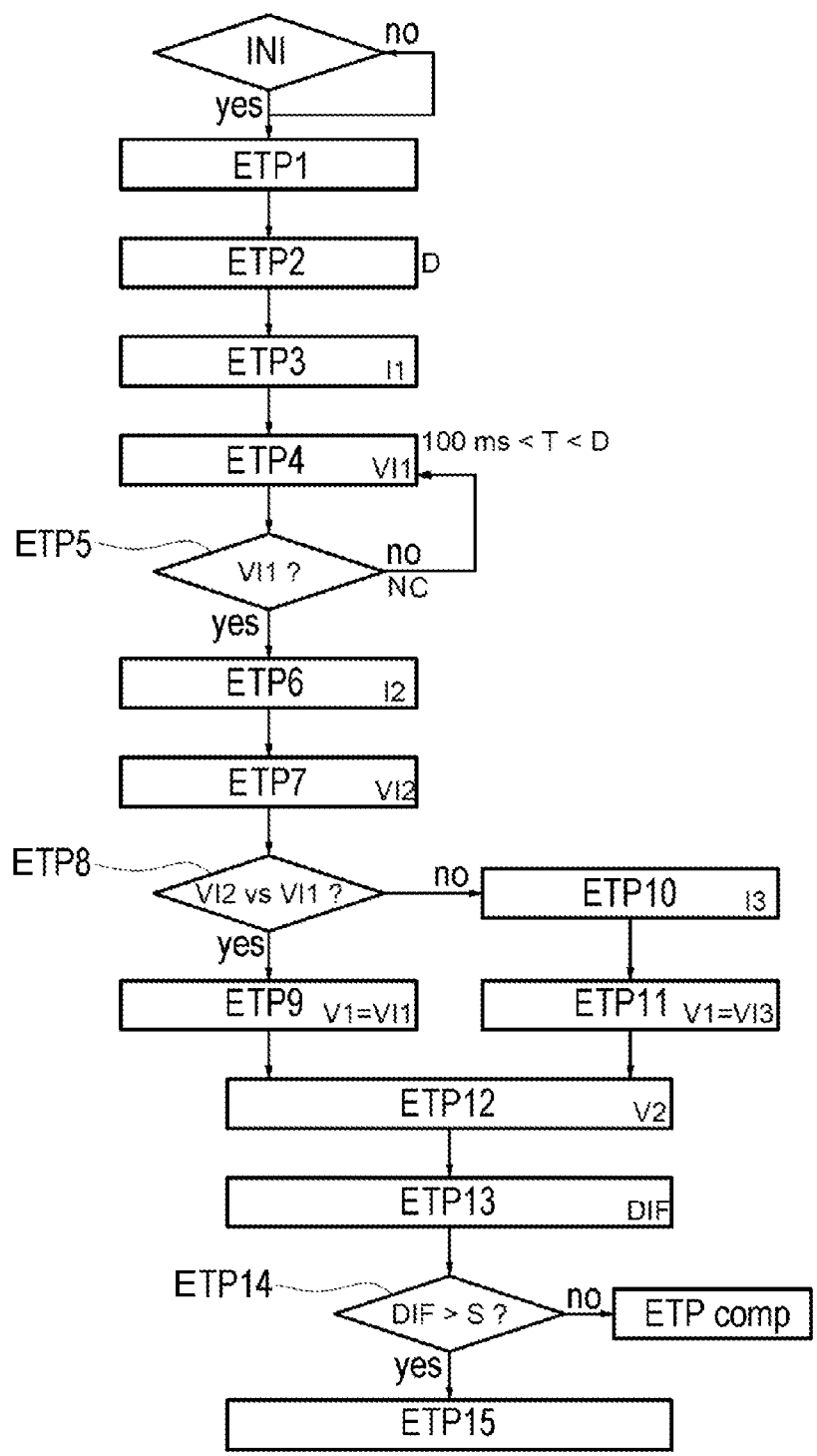

FIG. 5 illustrates schematically one example of a method for managing the output power supply voltage of a USB Type-C source device, for example, the source device DS of the system SYS (FIG. 4).

Any voltage drop monitoring or any voltage compensation on the cable CBL preferably begins with an initialization INI without connection of the cable CBL between the source device DS and the receiver device DR.

According to the USB 3.1 Type-C standard, the voltage on the channel configuration pins CC1_S and CC2_S of the source device DS must be higher than 2.7 V.

If this initialization condition INI is satisfactory, a first step ETP1 is undertaken by connecting the source device DS to the receiver device DR via the cable CBL.

Once the connection has been established in the first step ETP1, a pull-down resistor Rd of the receiver device DR and a pull-up resistor Rp of the source device DS are coupled to the cable CBL so as to respectively be recognized as a "source" and as a "receiver."

In the example illustrated in FIG. 4, one of the two channel configuration pins CC1_S or CC2_S of the source device DS is connected to the channel configuration pin CC of the cable CBL and to the current source SC capable of delivering various currents having various values.

In a second step ETP2, the power switch CP goes into its open state as soon as the cable CBL is connected for a period D; the receiver device DR is therefore not powered.

Prior to carrying out a first measurement of a first voltage V1 on the channel configuration pin CC of the cable, the source device DS is preferably configured for performing initial condition measurements in such a manner as to discover the quality of the cable CBL and for detecting a potential overload of the receiver device DR.

It should be noted that a receiver device DR with a defective power supply does not provide a known conventional impedance, for example, here 5100 ohms.

In order to verify this condition, a first initial measurement of a first initial voltage VI1 is firstly carried out.

In a third step ETP3, the current source SC is first of all configured for delivering a first current I1 having a first value, here, for example, 80 µA. It goes without saying that this first value could of course be any given other value.

The measurement circuitry MMES subsequently carry out, in a fourth step ETP4, a first initial measurement of a first initial voltage VI1 on the channel configuration pin CC of the cable CBL, in the presence of the first current I1.

If this measured first initial voltage VI1 is not situated around a predefined value, here, for example, equal to 5100*80 µV+/−10%, with 5100 ohms as the value of impedance of a known conventional pull-down resistance, in a fifth step ETP5, it may be determined that a non-conformity NC of the receiver device DR exists and that thus, at least temporarily, the receiver device DR cannot benefit from the compensation for the voltage drop in the cable CBL.

The non-conformity NC may, for example, result from a defective battery of the receiver device DR, for example, a completely discharged battery or a battery in safety mode which is not capable of supplying a minimal operating voltage.

In that case, the method returns to the fourth step ETP4 so as to re-measure the initial voltage VI1 until the non-conformity NC of the receiver device DR is no longer detected.

The time T of the first initial measurement of the first initial voltage VI1 advantageously lasts for at least 100 ms and does not exceed the channel configuration response time (period D), being, for example, 200 ms.

If the non-conformity NC is not detected in the fifth step ETP5, the current source SC is subsequently configured for delivering, in a sixth step ETP6, a second current I2 having a second value, here, for example, 320 µA, i.e., four times the first value.

Then, in a seventh step ETP7, the measurement circuitry MMES carries out a second initial measurement of a second initial voltage VI2 on the channel configuration pin CC of the cable CBL, in the presence of the second current I2.

If the first initial voltage VI1 is around the known value, i.e., 5100*80 µV, in an eighth step ETP8, the controller MCOM verifies whether the second initial voltage VI2 is in fact around a value proportional to the first initial voltage VI1, i.e., around 5100*320 µV.

In the case where the first and second initial voltages VI1 and VI2 are in proportion (ETP9), the smallest of the first and second initial voltages VI1 and VI2, here the first initial voltage VI1, is chosen by the controller MCOM as first voltage V1.

If the first and second initial voltages VI1 and VI2 are not proportional, the first and second initial voltages VI1 and VI2 are therefore not valid for determining the voltage drop in the cable CBL.

In a tenth step ETP10, the current source SC delivers a third current I3 having a value less than that of the first current I1 to the receiver device DR prior to the closing of the power switch CP.

For this reason, the measurement circuit MMES then carries out a third initial measurement of a third initial voltage VI3 on the channel configuration pin CC of the cable CBL in an eleventh step ETP11. This third initial voltage VI3 is subsequently used as first voltage V1 so as to calculate the voltage drop in the cable CBL.

It should be noted that all these initial measurements are finished before the end of the channel configuration response time (period D) and hence prior to the closing of the power switch CP.

In a twelfth step ETP12, the measurement circuit MMES carries out a second measurement of a second voltage V2 after the closing of the power switch CP. In that case, the receiver device DR is powered by the source device DS via the cable CBL.

The computation circuitry MCAL carries out a calculation of the difference DIF between the first and second voltages V1 and V2 in a thirteenth step ETP13.

The controller MCOM subsequently verifies whether the difference DIF exceeds a predefined threshold S, here, for example, 250 mV (ETP14) representing the maximum voltage drop permitted in the ground conductor according to the USB Type-C standard.

In the case where the difference DIF is less than or equal to the threshold S, in a compensation step ETP COMP, the controller MCOM increases the output power supply voltage V_BUS as a function of this difference DIF so as to compensate for the voltage drop in the cable CBL. The compensation value on the output power supply voltage V_BUS is advantageously in the range between one and three times the value of the difference DIF so as to maintain a correct operation of the cable CBL according to the USB 3.1 Type-C standard.

Indeed, the difference only represents the voltage drop in the ground conductor of the cable, in other words the conductor between a channel configuration pin and the ground of the cable.

According to the USB 3.1 Type-C standard, the resistance of the ground conductor is two times lower than the conductor transporting the voltage with a positive potential VBUS in this USB Type-C standard. In other words, the total voltage drop in the cable may reach up to three times the calculated difference.

Of course, the compensation value could be limited to two times the value of the difference in the case of a topology with a cable attached to the source in which the resistances of the ground conductor and of the conductor transporting the positive voltage are identical.

In order to avoid any risk of overvoltage in the receiver device, it is also possible to only compensate for the voltage drop in the ground conductor, within the limit of the tolerances of the specification, i.e., 10% of the nominal voltage in the source device.

If the difference DIF exceeds the threshold S, the power switch CP is configured for returning to its open state in order to protect the source device DS, together with the receiver device DR (ETP 15).

Figure 6:
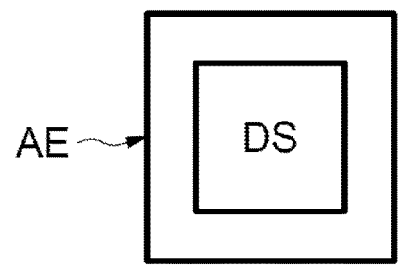

As illustrated schematically in FIG. 6, the source device DS may be incorporated into an electronic apparatus AE, such as a cellular mobile telephone, tablet, portable or desktop computer, or data processing server.

What is claimed is:

1. A method for managing a power supply voltage on an output power supply pin of a USB Type-C source device coupled to and configured to supply power to a USB Type-C receiver device via a USB Type-C cable, the method comprising:
    disconnecting the output power supply pin of the source device from the receiver device by opening a power switch comprised in the source device and coupled between the output power supply pin and the power supply voltage, wherein the source device remains powered by the power supply voltage during and after the disconnecting, and wherein the receiver device is not powered as a result of the disconnecting;
    performing, by a measurement circuit comprised in the source device and coupled to a channel configuration pin of the source device, a first measurement of a first voltage on a channel configuration pin of the cable when the power switch of the source device is open and the receiver device is not powered, wherein the channel configuration pin of the source device is coupled to the channel configuration pin of the cable;
    connecting the output power supply pin of the source device to the receiver device by closing the power switch comprised in the source device, wherein the receiver device is powered by the power supply voltage through the output power supply pin of the source device as a result of the connecting;
    performing, by the measurement circuit comprised in the source device, a second measurement of a second voltage on the channel configuration pin of the cable when the power switch is closed and the receiver device is powered through the output power supply pin of the source device;
    calculating, by computation circuitry comprised in the source device, a difference between the first voltage and the second voltage, the difference being indicative of a voltage drop across the cable; and
    modifying, by a controller comprised in the source device and coupled between the channel configuration pin of the source device and the output power supply pin of the source device, the power supply voltage as a function of a value of the difference to compensate for the voltage drop across the cable, wherein a first input of the controller is coupled to the channel configuration pin of the source device, a second input of the controller is controllably coupled to the channel configuration pin of the source device, and an output of the controller is coupled to the output power supply pin of the source device.

2. The method according to claim 1, wherein modifying the power supply voltage comprises increasing the power supply voltage by a compensation value when the difference is less than or equal to a threshold.

3. The method according to claim 2, wherein the compensation value is between one and three times the value of the difference.

4. The method according to claim 2, wherein modifying the power supply voltage comprises interrupting the power supply voltage by opening the power switch of the source device when the difference exceeds the threshold.

5. The method according to claim 1, wherein the first measurement of the first voltage is carried out by the measurement circuit over a period during which the receiver device is not powered, and the second measurement of the second voltage is carried out at an end of the period and as soon as the receiver device is powered by the power supply voltage through the output power supply pin of the source device.

6. The method according to claim 5, wherein performing the first measurement of the first voltage on the channel configuration pin of the cable when the power switch of the source device is open and the receiver device is not powered comprises:
   delivering, by a variable current source comprised in the source device and coupled to the channel configuration pin of the source device, a first current on the channel configuration pin of the source device during the period;
   performing, by the measurement circuit, a first initial measurement of a first initial voltage on the channel configuration pin of the source device;
   delivering, by the variable current source, a second current, which is higher than and proportional to the first current, on the channel configuration pin of the source device; and
   performing, by the measurement circuit, a second initial measurement of a second initial voltage on the channel configuration pin of the source device.

7. The method according to claim 6, wherein the first initial voltage and the second initial voltage are proportional and wherein the first initial measurement of the first initial voltage is designated as the first measurement of the first voltage.

8. The method according to claim 6, wherein the first initial voltage and the second initial voltage are not proportional, the method further comprising delivering, by the variable current source, a third current, which is less than the first current, on the channel configuration pin and performing a third initial measurement of a third initial voltage on the channel configuration pin, wherein the third initial measurement of the third initial voltage is designated as the first measurement of the first voltage.

9. A source device for use in a USB Type-C system that includes a receiver device electrically coupled to the source device by a cable, the source device being configured to be powered by a power supply voltage and to supply power to the receiver device, the source device comprising:
   a power switch coupled between an output power supply pin of the source device and the power supply voltage, wherein the source device remains powered by the power supply voltage during and after the power switch is open, wherein the receiver device is powered when the power switch is closed, and wherein the receiver device is not powered when the power switch is open;
   a measurement circuit coupled to a channel configuration pin of the source device, the measurement circuit being configured to carry out a first measurement of a first voltage on the channel configuration pin of the cable when the power switch of the source device is open and the receiver device is not powered and to carry out a second measurement of a second voltage on the channel configuration pin of the cable when the power switch is closed and the receiver device is powered through the output power supply pin of the source device;
   computation circuitry configured to calculate a difference between the first voltage and second voltage, the difference being indicative of a voltage drop across the cable; and
   a controller coupled between the channel configuration pin of the source device and the output power supply pin of the source device, the controller being configured to carry out a modification of the power supply voltage carried on the output power supply pin of the source device, the modification being a function of the difference between the first and second voltages and to compensate for the voltage drop across the cable, wherein a first input of the controller is coupled to the channel configuration pin of the source device, a second input of the controller is controllably coupled to the channel configuration pin of the source device, and an output of the controller is coupled to the output power supply pin of the source device.

10. The source device according to claim 9, wherein the controller is configured to increase the power supply voltage by a compensation value when the difference is less than or equal to a threshold.

11. The source device according to claim 10, wherein the compensation value is between one and three times the value of the difference.

12. The source device according to claim 10, wherein the controller is configured to interrupt the power supply voltage by opening the power switch of the source device when the difference exceeds the threshold.

13. The source device according to claim 9, wherein the measurement circuit is configured to carry out the first measurement of the first voltage over a period during which the receiver device is not powered, and to carry out the second measurement of the second voltage at an end of the period and as soon as the receiver device is powered by the power supply voltage through the output power supply pin of the source device.

14. The source device according to claim 13, further comprising a variable current source coupled to the channel configuration pin of the source device and configured to deliver, during the period, a first current on the channel configuration pin of the source device and a second current, which is higher than and proportional to the first current, on the channel configuration pin of the source device, wherein the measurement circuit is further configured to carry out, in the presence of the first current, a first initial measurement of a first initial voltage on the channel configuration pin of the source device and a second initial measurement of a second initial voltage on the channel configuration pin of the source device in the presence of the second current.

15. The source device according to claim 14, wherein, when the first and second initial voltages are proportional, the controller is configured to select the first initial measurement of the first initial voltage as the first measurement of the first voltage.

16. The source device according to claim 14, wherein, when the first and second initial voltages are not proportional, the variable current source is configured to deliver a third current, which is less than the first current, on the channel configuration pin of the source device, wherein the measurement circuit is further configured to carry out a third initial measurement of a third initial voltage on the channel configuration pin of the source device, and wherein the controller is further configured to select the third initial measurement of the third initial voltage as the first measurement of the first voltage.

17. An electronic apparatus comprising the source device according to claim 9, wherein the electronic apparatus comprises a cellular mobile telephone, a tablet, or a portable computer.

18. A system comprising:
- a USB Type-C receiver device;
- a USB Type-C cable; and
- a USB Type-C source device electrically coupled to the USB Type-C receiver device via the USB Type-C cable, wherein the source device is configured to be powered by a power supply voltage and to supply power to the receiver device, wherein the source device comprises:
  - a power switch coupled between an output power supply pin of the source device and the power supply voltage, wherein the source device remains powered by the power supply voltage during and after the power switch is open, wherein the receiver device is powered when the power switch is closed, and wherein the receiver device is not powered when the power switch is open;
- a measurement circuit coupled to a channel configuration pin of the source device, the measurement circuit being configured to carry out a first measurement of a first voltage on the channel configuration pin of the cable when the power switch of the source device is open and the receiver device is not powered and to carry out a second measurement of a second voltage on the channel configuration pin of the cable when the receiver device is powered through the output power supply pin of the source device;
  - computation circuitry configured to calculate a difference between the first voltage and the second voltage, the difference being indicative of a voltage drop across the cable; and
  - a controller coupled between the channel configuration pin of the source device and the output power supply pin of the source device, the controller being configured to carry out a modification of the power supply voltage carried on the output power supply pin of the source device, the modification being a function of the difference between the first and second voltages and to compensate for the voltage drop across the cable, wherein a first input of the controller is coupled to the channel configuration pin of the source device, a second input of the controller is controllably coupled to the channel configuration pin of the source device, and an output of the controller is coupled to the output power supply pin of the source device.

19. The system according to claim 18, wherein the controller is configured to increase the power supply voltage by a compensation value when the difference is less than or equal to a threshold and is configured to interrupt the power supply voltage when the difference exceeds the threshold.

20. The system according to claim 18, wherein the measurement circuit is configured to carry out the first measurement of the first voltage over a period during which the receiver device is not powered, and to carry out the second measurement of the second voltage at an end of the period and as soon as the receiver device is powered by the power supply voltage through the output power supply pin of the source device.

21. The system according to claim 20, wherein the source device further comprises a variable current source coupled to the channel configuration pin of the source device and configured to deliver, during the period, a first current on the channel configuration pin of the source device and a second current, which is higher than and proportional to the first current, on the channel configuration pin of the source device, wherein the measurement circuit is further configured to carry out, in the presence of the first current, a first initial measurement of a first initial voltage on the channel configuration pin of the source device and a second initial measurement of a second initial voltage on the channel configuration pin of the source device in the presence of the second current.

22. The system according to claim 21, wherein, when the first and second initial voltages are proportional, the controller is configured to select the first initial measurement of the first initial voltage as the first measurement of the first voltage; and wherein, when the first and second initial voltages are not proportional, the variable current source is configured to deliver a third current, which is less than the first current, on the channel configuration pin of the source device, wherein the measurement circuit is further configured to carry out a third initial measurement of a third initial voltage on the channel configuration pin of the source device, and wherein the controller is further configured to select the third initial measurement of the third initial voltage as the first measurement of the first voltage.

* * * * *